(12) United States Patent
Komoto et al.

(10) Patent No.: US 8,186,696 B2
(45) Date of Patent: May 29, 2012

(54) STEERING TIE ROD END MADE OF STEEL AND METHOD OF MANUFACTURING THE SAME

(75) Inventors: Takeshi Komoto, Nagoya (JP); Hitoshi Sakuma, Toyota (JP); Takashi Hirano, Toyota (JP); Hiroyuki Mizuno, Tokai (JP); Shinya Teramoto, Chiyoda-ku (JP); Masahiro Toda, Chiyoda-ku (JP); Hiromasa Takada, Chiyoda-ku (JP); Makoto Okonogi, Chiyoda-ku (JP)

(73) Assignees: Toyota Jidosha Kabushiki Kaisha, Aichi-Ken (JP); Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/811,416

(22) PCT Filed: Sep. 7, 2009

(86) PCT No.: PCT/IB2009/006773
§ 371 (c)(1),
(2), (4) Date: Jul. 1, 2010

(87) PCT Pub. No.: WO2010/035095
PCT Pub. Date: Apr. 1, 2010

(65) Prior Publication Data
US 2011/0163512 A1 Jul. 7, 2011

(30) Foreign Application Priority Data
Sep. 26, 2008 (JP) ................................. 2008-248397

(51) Int. Cl.
*B62D 7/16* (2006.01)

(52) U.S. Cl. ..................................... 280/93.51; 148/654
(58) Field of Classification Search ............... 280/93.51, 280/93.511, 93.512, 124.128, 124.13
See application file for complete search history.

(56) References Cited

U.S. PATENT DOCUMENTS

| 2,020,149 | A | 11/1935 | Leighton |
| 2,528,637 | A * | 11/1950 | Clarke, Jr. ..................... 148/326 |
| 5,080,520 | A * | 1/1992 | Wood, Jr. ......................... 403/77 |
| 6,599,469 | B2 * | 7/2003 | Ishida et al. .................... 420/87 |
| 2001/0026039 | A1 * | 10/2001 | Hasegawa et al. ............ 267/292 |
| 2003/0168826 | A1 | 9/2003 | Spagnuolo et al. |

FOREIGN PATENT DOCUMENTS
EP     0 964 171 A2     12/1999
(Continued)

*Primary Examiner* — Faye M. Fleming
(74) *Attorney, Agent, or Firm* — Sughrue Mion, PLLC

(57) ABSTRACT

A steel tie rod end includes a shaft portion and first and second fitting portions. A minimum area portion having a small radially cross-sectional area is provided for the shaft portion, and 90% or above of a steel structure of the minimum area portion is formed of martensite or tempered martensite. The surface hardness of the minimum area portion and the average hardness of the radial cross section of the minimum area portion are 600 Hv or below, and the average hardness of the radial cross section of the first fitting portion and the average hardness of the radial cross section of the second fitting portion are 300 Hv or below. A method of manufacturing a steel tie rod end includes a quenching process of heating only a prospective shaft portion by high frequency to an austenitizing temperature and then rapidly cooling the prospective shaft portion by water or cooling medium.

9 Claims, 1 Drawing Sheet

FOREIGN PATENT DOCUMENTS

| | | |
|---|---|---|
| EP | 1 069 201 A2 | 1/2001 |
| EP | 1 254 789 A1 | 11/2002 |
| JP | 05-75064 U | 10/1993 |
| JP | 06-055237 A | 3/1994 |
| JP | 07-37862 U | 7/1995 |
| JP | 10-195589 A | 7/1998 |
| JP | 2004-210063 A | 7/2004 |
| JP | 2005-526654 A | 9/2005 |
| JP | 2006-104552 A | 4/2006 |
| JP | 2007-245843 A | 9/2007 |

* cited by examiner

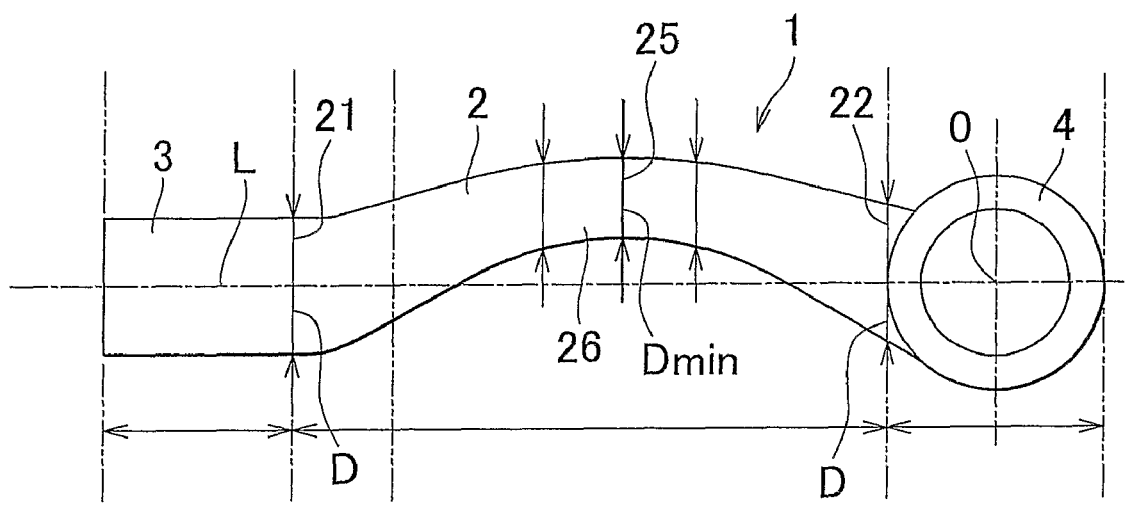

STEERING TIE ROD END MADE OF STEEL AND METHOD OF MANUFACTURING THE SAME

BACKGROUND OF THE INVENTION

1. Field of the Invention

The invention relates to a steel tie rod end that constitutes part of a vehicle steering system and a method of manufacturing the steel tie rod end.

2. Description of the Related Art

Tie rods are components that constitute part of a vehicle steering system. The tie rods couple the steering system (for example, a steering gear of a rack and pinion steering system) to front wheel side components (for example, knuckle arms).

Rotational motion of a steering wheel is transmitted to the steering system via a steering shaft. Then, the rotational motion is converted into linear motion by the steering system, and the linear motion is transmitted to front wheels via the tie rods and the knuckle arms. Each tie rod typically includes a tie rod body and a tie rod end. The tie rod body is assembled to the steering system via a ball joint. One end of the tie rod end is assembled to the tie rod body, and the other end of the tie rod end is assembled to the knuckle arm via a second ball joint.

A typical tie rod end is made of a steel material, such as a carbon steel and a low-alloy steel, and has a shaft portion and two fitting portions. The two fitting portions are formed at both ends of the shaft portion. As described above, one of the fitting portions is assembled to the tie rod body, and the other one of the fitting portions is assembled to the knuckle arm.

Incidentally, in order to improve steering feel, it is generally considered a good approach that the rigidity of each tie rod end is decreased to increase the flexibility of each tie rod end to thereby smoothly transmit steering operation to the front wheels. Note that the rigidity indicates a necessary load with which the tie rod end is elastically deformed by a predetermined length in the axial direction (longitudinal direction). A tie rod end having a low rigidity deforms by a large amount with a small load.

Various techniques have been suggested in order to decrease the rigidity of a tie rod end (or a tie rod) (for example, see Japanese Utility Model Application Publication No. 7-37862 (JP-U-7-37862)).

JP-U-7-37862 describes a method in which the cross-sectional area of the shaft portion is reduced. Because the tie rod ends are components mounted on a vehicle, it is desirable that the cross-sectional area of the shaft portion of each tie rod end is reduced in terms of space saving and light weight. However, when the cross-sectional area of the shaft portion is just simply reduced, the strength of each tie rod end decreases. This may possibly make it difficult to ensure necessary strength. A tie rod end having a poor strength may possibly buckle or break.

In addition, when a high strength material is used as the material of the tie rod end, it is presumable that a decrease in strength of the tie rod end may be suppressed although the rigidity of the tie rod end is decreased with a reduction in the cross-sectional area of the shaft portion. However, generally, forming a tie rod end (particularly, forming fitting portions) requires machining, such as cutting. Therefore, if the high strength material is used as the material of the tie rod end, machinability deteriorates. This problematically increases cost for manufacturing the tie rod end.

Furthermore, the tie rod ends are components that receive a relatively large impact because the tie rod ends are connected to drive wheels. As described above, the tie rod ends are components that are assembled to the steering system. Thus, if any of the tie rod ends breaks because of an impact in the event of a collision, or the like, steering function is impaired. Thus, a tie rod is required to not only have the above described low rigidity and high strength but also have a high impact characteristic. Particularly, because the toughness of a steel material decreases at a low temperature, there is a need for a tie rod end that also exhibits a high impact characteristic at a low temperature.

SUMMARY OF THE INVENTION

The invention provides a tie rod end that has a low rigidity and a high strength and also has a high impact characteristic, and also provides a method of manufacturing the tie rod end.

A first aspect of the invention relates to a steel tie rod end. The steel tie rod end includes: a shaft portion; a first fitting portion that is continuous with a first end portion of the shaft portion in a longitudinal direction of the shaft portion; and a second fitting portion that is continuous with a second end portion of the shaft portion in the longitudinal direction of the shaft portion, wherein the shaft portion has a minimum area portion that is located between the first end portion and the second end portion, and a radially cross-sectional area of the minimum area portion is 80% or below of a radially cross-sectional area of the first end portion and 80% or below of a radially cross-sectional area of the second end portion, a martensite fraction of a steel structure of the minimum area portion is 90% or above, a surface hardness of the minimum area portion and an average hardness of a radial cross section of the minimum area portion are 600 Hv or below, and an average hardness of a radial cross section of the first fitting portion and an average hardness of a radial cross section of the second fitting portion are 300 Hv or below.

The shaft portion of the above steel tie rod end has a minimum area portion of which the cross-sectional area is smaller than those of two end portions (the first end portion and the second end portion) in the longitudinal direction thereof. In addition, the radially cross-sectional area of the minimum area portion is 80% or below of the radially cross-sectional area of the first end portion and 80% or below of the radially cross-sectional area of the second end portion, so the radially cross-sectional area of the minimum area portion is sufficiently small. Thus, the steel tie rod end has a low rigidity and is able to implement space saving and light weight.

In addition, the martensite fraction of the steel structure of the minimum area portion of the steel tie rod end is 90% or above. The martensite structure has a high strength. Therefore, when 90% or above of the steel structure of the minimum area portion is formed of martensite or tempered martensite, it is possible to give a necessary strength to the shaft portion having the minimum area portion of which the cross-sectional area is small. Thus, the tie rod end may have a low rigidity and a high strength. In addition, if the minimum area portion has a high hardness, the impact characteristic of the shaft portion decreases. However, in the above steel tie rod end, the surface hardness of the minimum area portion and the average hardness of the radial cross section of the minimum area portion are 600 Hv or below, so it is possible to ensure impact characteristic necessary for the tie rod end. Note that when the steel structure of the minimum area portion is composed of tempered martensite, the ductility and toughness of the shaft portion may be advantageously improved. Hereinafter, tempered martensite is simply referred to as martensite. In addition, the hardness according to the first aspect of the invention indicates a Vickers hardness according to the Vickers hardness test method described in JISZ2244.

As described above, the steel tie rod end has a low rigidity, high strength and excellent impact characteristic. Thus, the above steel tie rod end excels in steering feel and is hard to buckle or break, and, in addition, is hard to break in the event of a collision.

Note that the minimum area portion according to the first aspect of the invention is all the portion of which the radially cross-sectional area is 80% or below of the radially cross-sectional area of the first end portion and 80% or below of the radially cross-sectional area of the second end portion in the shaft portion. In addition, the radially cross-sectional area of the minimum area portion is an area of a cross section, taken along a plane perpendicular to an axis of the shaft portion, of the minimum area portion. Similarly, the radially cross-sectional area of the first end portion is an area of a cross section, taken along a plane perpendicular to the axis of the shaft portion, of a portion of the shaft portion adjacent to a boundary between the shaft portion and the first fitting portion. The radially cross-sectional area of the second end portion is an area of a cross section, taken along a plane perpendicular to the axis of the shaft portion, of a portion of the shaft portion adjacent to a boundary between the shaft portion and the second fitting portion.

In the above first aspect, the average hardness of the radial cross section of the minimum area portion may be higher by 100 Hv or above than the average hardness of the radial cross section of the first fitting portion and the average hardness of the radial cross section of the second fitting portion.

With the above configuration, the average hardness of the minimum area portion is high. Thus, it is possible to give a necessary strength to the shaft portion having the minimum area portion of which the cross-sectional area is small, and the tie rod end may have a low rigidity and high strength. Therefore, the above steel tie rod end is hard to buckle or break.

A second aspect of the invention relates to a method of manufacturing a steel tie rod end. The method of manufacturing a steel tie rod end includes: a forming process of forming a tie rod end intermediate that includes a prospective shaft portion, a prospective first fitting portion continuous with a prospective first end portion of the prospective shaft portion in a longitudinal direction of the prospective shaft portion and a prospective second fitting portion continuous with a prospective second end portion of the prospective shaft portion in a longitudinal direction of the prospective shaft portion; a quenching process of applying high-frequency quenching to the prospective shaft portion of the tie rod end intermediate and then cooling the prospective shaft portion; and a machining process of machining at least one of the first fitting portion and the second fitting portion, wherein, in the forming process, a prospective minimum area portion is formed between the prospective first end portion and the prospective second end portion in the prospective shaft portion so that a radially cross-sectional area of the prospective minimum area portion is 80% or below of a radially cross-sectional area of the prospective first end portion and 80% or below of a radially cross-sectional area of the prospective second end portion, and, in the quenching process, only the prospective shaft portion is heated by high frequency to an austenitizing temperature and then rapidly cooled by water or cooling medium.

The above method of manufacturing a steel tie rod end forms the prospective minimum area portion, of which a radially cross-sectional area is small, in a tie rod end intermediate (that is, a tie rod end before being subjected to quenching) in the forming process. Thus, the rigidity of the quenched tie rod end may be decreased.

In addition, in the quenching process, only the prospective shaft portion is heated by high frequency (that is, quenching process is applied only to the prospective shaft portion). Thus, the steel structure of the shaft portion (particularly, the minimum area portion) may be transformed into a martensite structure, so the strength of the shaft portion may be improved.

Furthermore, in the quenching process, the prospective shaft portion is rapidly cooled. Thus, 90% or above of the steel structure of the minimum area portion may be formed of martensite, and the surface hardness of the minimum area portion and the average hardness of the radial cross section of the minimum area portion in the shaft portion are 600 Hv or below. By so doing, it is possible to give an excellent impact characteristic to the shaft portion. Thus, with the above method of manufacturing a steel tie rod end, it is possible to manufacture a tie rod end that has an excellent strength and impact characteristic. Note that the prospective shaft portion, prospective first fitting portion, prospective second fitting portion, prospective first end portion, prospective second end portion and prospective minimum area portion in the above manufacturing method respectively correspond to the shaft portion, first fitting portion, second fitting portion, first end portion, second end portion and minimum area portion in the steel tie rod end according to the first aspect of the invention.

In the second aspect, the method may further include a tempering process of, after the quenching process, heating the prospective shaft portion again and then cooling the prospective shaft portion.

The material of the steel tie rod end according to the second aspect of the invention may be a steel material, such as a carbon steel and a low-alloy steel.

The method of manufacturing a steel tie rod end according to the second aspect of the invention includes the forming process and the quenching process. A method of forming the tie rod end intermediate in the forming process may be a known method, such as hot forging and cold forging.

The quenching process is a process of quenching only the prospective shaft portion of the tie rod end intermediate by high frequency. By applying high-frequency quenching only to the prospective shaft portion, the fitting portions may have a relatively low strength. Thus, it is advantageous in that the fitting portions may be easily machined.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a view that schematically illustrates a steel tie rod end according to an embodiment of the invention.

DETAILED DESCRIPTION OF EMBODIMENTS

Hereinafter, a steel tie rod end and a method of manufacturing the steel tie rod end according to an embodiment of the invention will be described.

A steel tie rod end according to the embodiment of the invention includes a shaft portion; a first fitting portion that is continuous with a first end portion of the shaft portion in a longitudinal direction of the shaft portion; and a second fitting portion that is continuous with a second end portion of the shaft portion in the longitudinal direction of the shaft portion, wherein the shaft portion has a minimum area portion that is located between the first end portion and the second end portion, and a radially cross-sectional area of the minimum area portion is 80% or below of a radially cross-sectional area of the first end portion and 80% or below of a radially cross-sectional area of the second end portion, a martensite fraction of a steel structure of the minimum area portion is 90% or above, a surface hardness of the minimum area portion and an average hardness of a radial cross section of the minimum area portion are 600 Hv or below, an average hardness of a radial cross section of the first fitting portion and an average hardness of a radial cross section of the second fitting portion are 300 Hv or below, and the average hardness of the radial cross section of the minimum area portion is higher by 100 Hv or above than the average hardness of the radial cross section of the first fitting portion and the average hardness of the radial cross section of the second fitting portion. In addition, a method of manufacturing a steel tie rod end according to the embodiment of the invention includes: a forming process of forming a tie rod end intermediate that includes a prospective shaft portion, a prospective first fitting portion continuous with a prospective first end portion of the prospective shaft portion in a longitudinal direction of the prospective shaft portion and a prospective second fitting portion continuous with a prospective second end portion of the prospective shaft portion in a longitudinal direction of the prospective shaft portion; a quenching process of applying high-frequency quenching to the prospective shaft portion of the tie rod end intermediate and then cooling the prospective shaft portion; and a machining process of machining at least one of the first fitting portion and the second fitting portion, wherein, in the forming process, a prospective minimum area portion is formed between the prospective first end portion and the prospective second end portion in the prospective shaft portion, a radially cross-sectional area of the prospective minimum area portion is 80% or below of a radially cross-sectional area of the prospective first end portion and a radially cross-sectional area of the prospective second end portion, in the quenching process, only the prospective shaft portion is heated by high frequency to an austenitizing temperature and then rapidly cooled by water or cooling medium, and, after the quenching process, the prospective shaft portion is heated again and cooled.

S48C is used as a material of the steel tie rod end according to the first embodiment.

As shown in FIG. 1, a steel tie rod end 1 according to the first embodiment includes a shaft portion 2, a first fitting portion 3 and a second fitting portion 4. Note that the first fitting portion 3 is fitted to a tie rod body (not shown), and has a substantially cylindrical shape having a diameter of 22 mm and an axial length of 35 mm. A threaded hole (not shown) is formed at an end of the first fitting portion 3. The threaded hole extends in the axial direction of the first fitting portion 3. The second fitting portion 4 is assembled to a knuckle arm (not shown) via a ball joint (not shown). The second fitting portion 4 has a substantially bowl shape so as to pivotably support the ball joint. The outer peripheral diameter of the second fitting portion 4 is 36 mm. Note that, as shown in FIG. 1, the center O of the second fitting portion 4 is located in an extension line of an axis L of the first fitting portion 3 (or at a position close to the extension line).

The shaft portion 2 couples the first fitting portion 3 to the second fitting portion 4. The shaft portion 2 has a bowed rod shape. The first fitting portion 3 is continuous with one end (first end portion 21) of the shaft portion 2 in the longitudinal direction. The second fitting portion 4 is continuous with the other end (second end portion 22) of the shaft portion 2 in the longitudinal direction. The first end portion 21 and the second end portion 22 each have the largest radially cross-sectional area in the shaft portion 2. A local minimum area portion 25 is formed at a substantially center of the shaft portion 2 in the longitudinal direction. The local minimum area portion 25 has a minimum radially cross-sectional area in the shaft portion 2. The radially cross-sectional area of the shaft portion 2 gradually varies from the first end portion 21 toward the local minimum area portion 25, and gradually varies from the second end portion 22 toward the local minimum area portion 25.

In the steel tie rod end 1 according to the first embodiment, the radially cross-sectional area (Dmin) of the local minimum area portion 25 is 301 mm$^2$, and the radially cross-sectional area of the first end portion 21 and the radially cross-sectional area (D) of the second end portion 22 each are 415 mm$^2$. The radially cross-sectional area of the local minimum area portion 25 is 72.5% of the radially cross-sectional area of the first end portion 21 and 72.5% of the radially cross-sectional area of the second end portion 22. The minimum area portion 26 in the steel tie rod end 1 according to the first embodiment is formed of the local minimum area portion 25, a portion that is located adjacent to the first end portion 21 with respect to the local minimum area portion 25 and that has a radially cross-sectional area of 332 mm$^2$ or below, and a portion that is located adjacent to the second end portion 22 with respect to the local minimum area portion 25 and that has a radially cross-sectional area of 332 mm$^2$ or below.

Hereinafter, a method of manufacturing the steel tie rod end according to the first embodiment will be described.

S48C is used as a steel material, and a tie rod end intermediate is formed by hot forging. The tie rod end intermediate includes a prospective shaft portion, a prospective first fitting portion and a prospective second fitting portion. The tie rod end intermediate has substantially the same shape as that of the steel tie rod end according to the above described first embodiment. The prospective shaft portion corresponds to the shaft portion in the steel tie rod end according to the first embodiment. The prospective first fitting portion corresponds to the first fitting portion in the steel tie rod end according to the first embodiment. The prospective second fitting portion corresponds to the second fitting portion in the steel tie rod end according to the first embodiment. At this time, a portion (prospective minimum area portion) of which the radially cross-sectional area is 80% or below of the radially cross-sectional area of the prospective first end portion and 80% or below of the radially cross-sectional area of the prospective second end portion is formed in the prospective shaft portion.

High-frequency quenching is applied to the prospective shaft portion of the tie rod end intermediate obtained in the forming process. Specifically, a coil having a cylindrical and straight shape is attached to the prospective shaft portion. The coil is energized to heat only the prospective shaft portion to an austenitizing temperature (for example, 900° C.) and is then rapidly cooled (cooled by water).

A tempering process is carried out so that the tie rod end intermediate after the quenching process is heated at a temperature of 420° C. for an hour and then cooled again by water at a temperature of 25° C.

In the tie rod end intermediate after the tempering process, the prospective first fitting portion is subjected to cutting to form a threaded hole.

Through the above processes, the tie rod end according to the first embodiment is obtained.

A steel tie rod end according to a second embodiment has a similar configuration to that of the steel tie rod end according to the first embodiment.

The steel tie rod end according to the second embodiment is made of boron steel (0.25% C-0.25% Si-1.0% Mn-0.2%

Cr-0.002% B), and has a substantially similar shape to that of the steel tie rod end according to the first embodiment. A method of manufacturing the steel tie rod end according to the second embodiment is similar to the method of manufacturing the steel tie rod end according to the first embodiment except that no tempering process is carried out. Note that in the method of manufacturing the steel tie rod end according to the second embodiment as well, the quenching temperature is 900° C.

A steel tie rod end according to a third embodiment has a similar configuration to that of the steel tie rod end according to the first embodiment. Note that a method of manufacturing the steel tie rod end according to the third embodiment is substantially similar to the method of manufacturing the steel tie rod end according to the above first embodiment.

The steel tie rod end according to the third embodiment is made of the same material as that of the steel tie rod end according to the second embodiment, and has a substantially similar shape to that of the steel tie rod end according to the first embodiment. The method of manufacturing the steel tie rod end according to the third embodiment is similar to the method of manufacturing the steel tie rod end according to the first embodiment except a tempering temperature in the tempering process. The tempering temperature in the method of manufacturing the steel tie rod end according to the third embodiment is 350° C.

A steel tie rod end according to a first comparative example is made of the same material as that of the steel tie rod end according to the first embodiment, and has a substantially similar shape to that of the steel tie rod end according to the first embodiment.

A method of manufacturing the steel tie rod end according to the first comparative example is similar to the method of manufacturing the steel tie rod end according to the first embodiment except that a tempering temperature. The tempering temperature in the method of manufacturing the steel tie rod end according to the first comparative example is 180° C.

A steel tie rod end according to a second comparative example is made of the same material as that of the steel tie rod end according to the first embodiment, and has a shape different from that of the steel tie rod end according to the first embodiment. Specifically, the steel tie rod end according to the second comparative example includes a first fitting portion and a second fitting portion that have similar shapes to those of the steel tie rod end according to the first embodiment; however, the shape of a shaft portion of the steel tie rod end according to the second comparative example is different from that of the steel tie rod end according to the first embodiment. More specifically, the radially cross-sectional area (Dmin) of a local minimum area portion in the steel tie rod end according to the second comparative example is 402 mm$^2$, and the radially cross-sectional area (D1) of the first end portion and the radially cross-sectional area (D2) of the second end portion are 415 mm$^2$. The radially cross-sectional area of the local minimum area portion is 96.9% of the radially cross-sectional area of the first end portion and 96.9% of the radially cross-sectional area of the second end portion. Thus, the steel tie rod end according to the second comparative example has no minimum area portion (that is, a portion of which the radially cross-sectional area is 80% or below of the radially cross-sectional area of the first end portion and 80% or below of the radially cross-sectional area of the second end portion, or a portion of which the radially cross-sectional area is 332 mm$^2$ or below).

A method of manufacturing the steel tie rod end according to the second comparative example is similar to the method of manufacturing the steel tie rod end according to the first embodiment except that the shape of a tie rod end intermediate is varied from the shape of the tie rod end intermediate for the steel tie rod end according to the first embodiment.

A steel tie rod end according to a third comparative example is made of the same material as that of the steel tie rod end according to the first embodiment, and has a substantially similar shape to that of the steel tie rod end according to the first embodiment.

A quenching process in a method of manufacturing the steel tie rod end according to the third comparative example is carried out in such a manner that a prospective shaft portion of a tie rod end intermediate having a similar shape to that of the first embodiment is heated by high frequency to a temperature of 900° C. and is then cooled by oil. The method of manufacturing the steel tie rod end according to the third comparative example is similar to the method of manufacturing the steel tie rod end according to the first embodiment except that cooling is carried out not by water but by oil in the quenching process.

A steel tie rod end according to a fourth comparative example is made of the same material as that of the steel tie rod end according to the first embodiment, and has a substantially similar shape to that of the steel tie rod end according to the first embodiment.

A method of manufacturing the steel tie rod end according to the fourth comparative example is similar to the method of manufacturing the steel tie rod end according to the first embodiment except a quenching method and a quenching range. Specifically, in the quenching process in the method of manufacturing the steel tie rod end according to the fourth comparative example, the entire tie rod end intermediate is heated at a temperature of 900° C. in a furnace.

A steel tie rod end according to a fifth comparative example is made of the same material as that of the steel tie rod end according to the first embodiment, and has a similar shape to that of the steel tie rod end according to the first comparative example.

A method of manufacturing the steel tie rod end according to the fifth comparative example includes a normalizing process instead of a quenching process and a tempering process. The normalizing process in the method of manufacturing the steel tie rod end according to the fifth comparative example is a process in which a tie rod end intermediate is heated to a transformation point or above (800° C. or above) and is then cooled by air.

The percentage of martensite in the steel structure of the minimum area portion (hereinafter, referred to as martensite fraction), hardness, rigidity, low-temperature impact characteristic, buckling load and machinability are evaluated for each of the steel tie rod ends according to the first to third embodiments and the steel tie rod ends according to the first to fifth comparative examples. The results of evaluation tests are shown in Table 1. The details of each test are described as follows.

The radial cross section (surface layer) of the local minimum area portion of each steel tie rod end is observed using an optical microscope, and the percentage of martensite structure is measured when the whole steel structure in the radial cross section of the local minimum area portion is 100 percent by area. The martensite fraction of the local minimum area portion is regarded as the martensite fraction of the minimum area portion.

For each steel tie rod end, the surface hardness of the local minimum area portion and the average hardness of the radial cross section of the local minimum area portion, the average hardness of the radial cross section of the first fitting portion and the average hardness of the radial cross section of the second fitting portion are measured in accordance with the Vickers hardness test method described in JISZ2244. The surface hardness of the local minimum area portion is regarded as the surface hardness of the minimum area portion. The average hardness of the radial cross section of the local minimum area portion is regarded as the average hardness of the minimum area portion. The average value of the average hardness of the radial cross section of the first fitting portion and the average hardness of the radial cross section of the second fitting portion is regarded as the average hardness of the radial cross sections of the first fitting portion and second fitting portion.

Each steel tie rod end is placed on a compression tester while being assembled to the tie rod. Then, an axial load is exerted on each steel tie rod end, and a load at which each steel tie rod end buckles is measured.

When the bucking load is measured in accordance with the above method, an axial load exerted on each steel tie rod end and an axial displacement of each steel tie rod end are measured. Then, the relationship between the measured load and the measured displacement is graphed, and the slope of the graph is calculated as the rigidity of each steel tie rod end.

A U-notch test piece (having a notch depth of 2 mm) described in JISZ2242 is prepared from the minimum area portion of each steel tie rod end, and Charpy impact test is carried out on each test piece at a temperature of −40° C.

Multiple pieces are manufactured for each steel tie rod end, and then machinability of each steel tie rod end is evaluated on the basis of the service life of a tool used to cut the first fitting portion in the machining process. Specifically, it is determined that the machinability is favorable (rating O) when no tool is broken at the time when 300 steel tie rod ends are manufactured. It is determined that the machinability is poor (rating x) when the tool is broken before 300 steel tie rod ends are manufactured.

TABLE 1

|  | Embodiments | | | Comparative Examples | | | | |
| --- | --- | --- | --- | --- | --- | --- | --- | --- |
|  | First | Second | Third | First | Second | Third | Fourth | Fifth |
| Steel Type | S48C | Boron Steel | Boron Steel | S48C | S48C | S48C | S48C | S48C |
| Tie Rod End Shape Dmin/D × 100 (%) | 72.5 | 72.5 | 72.5 | 72.5 | 96.9 | 72.5 | 72.5 | 96.9 |
| Martensite Fraction (%) at Minimum Area Portion | 100 | 95 | 100 | 94 | 90 | 74 | 91 | 0 |
| Surface Hardness (HV) of Shaft Portion | 480 | 510 | 400 | 670 | 490 | 420 | 490 | 210 |
| Average Hardness (HV) of Shaft Portion | 430 | 500 | 400 | 650 | 450 | 390 | 450 | 210 |
| Hardness (HV) of First Fitting Portion and Second Fitting Portion | 220 | 220 | 220 | 220 | 220 | 220 | 450 | 210 |
| Quenching Method | High Frequency | High Frequency | High Frequency | High Frequency | High Frequency | High Frequency | Furnace Heating | Normalizing |
| Quenching Range | Shaft Portion | Shaft Portion | Shaft Portion | Shaft Portion | Shaft Portion | Shaft Portion | Whole | — |
| Tempering Temperature (° C.) | 420 | — | 350 | 180 | 420 | 420 | 420 | — |
| Rigidity (kN/mm) | 38 | 37 | 39 | 38 | 61 | 36 | 39 | 63 |
| Low-Temperature Impact Characteristic (J/cm²) | 80 | 105 | 120 | 15 | 80 | 80 | 80 | 65 |
| Buckling Load (kN) | 55 | 56 | 54 | 56 | 71 | 46 | 55 | 54 |
| Machinability | O | O | O | O | O | O | x | O |

As shown in Table 1, each of the steel tie rod ends according to the first to third embodiments has the minimum area portion (which is formed of a portion of the shaft portion between the first end portion and the second end portion and of which the radially cross-sectional area is 80% or below of the radially cross-sectional area of the first end portion and 80% or below of the radially cross-sectional area of the second end portion). In addition, the martensite fraction of the minimum area portion (local minimum area portion) in each of the steel tie rod ends according to the first to third embodiments is 90% or above. Furthermore, the surface hardness of the minimum area portion and the average hardness of the radial cross section of the minimum area portion are 600 Hv or below, and the average hardness of the radial cross section of the first fitting portion and the average hardness of the radial cross section of the second fitting portion are 300 Hv or below.

The rigidity of each of the steel tie rod ends according to the first to third embodiments is 37 to 39 kN/mm, and is sufficiently low. In contrast, the rigidity of each of the steel tie rod ends according to the second and fifth comparative examples having no minimum area portion is 61 to 63 kN/mm, and is remarkably high. It is apparent from the above results that the minimum area portion provided for the shaft portion decreases the rigidity of the steel tie rod end by a large amount. Note that a low-rigidity steel tie rod end easily bows, so a vehicle equipped with the low-rigidity steel tie rod end excels in steering feel.

In addition, the martensite fraction of the minimum area portion in each of the steel tie rod ends according to the first to third embodiments is 90% or above, so the strength of the minimum area portion is high (hardness 430 to 510 Hv). In contrast, the martensite fraction of the minimum area portion in each of the steel tie rod ends according to the third and fifth comparative examples is low (0 to 74%), and the strength of the minimum area portion is remarkably low (hardness 210 to 420 Hv). It is apparent from the above results that, when the martensite fraction of the minimum area portion is 90% or above, the strength of the minimum area portion may be increased and, by extension, the strength of the shaft portion may be increased even when the shaft portion has a low rigidity. Note that the high strength of each of the steel tie rod ends according to the first to third embodiments is confirmed by the large buckling load (54 to 56 kN) of each of the steel tie rod ends according to the first to third embodiments.

In contrast, in the steel tie rod end according to the first comparative example, because the tempering temperature is excessively low, the surface hardness of the minimum area portion and the average hardness of the radial cross section of the minimum area portion exceed 600 Hv. As a result, the steel tie rod end according to the first comparative example has a poor impact characteristic.

In addition, in the steel tie rod end according to the fifth comparative example, because normalizing process is carried out instead of high-frequency quenching, the martensite fraction of the minimum area portion is low, and the strength of the shaft portion is considerably low.

Furthermore, in the steel tie rod end according to the first embodiment in which only the shaft portion is subjected to high-frequency quenching, as compared with the steel tie rod end according to the fourth comparative example in which the whole tie rod end intermediate is heated in a furnace, the strength of the first fitting portion and the second fitting portion is low (average hardness 300 Hv or below), and the machinability is high. It is apparent from the above results that the strength of the first fitting portion and the second fitting portion in the steel tie rod end may be decreased by heating only the shaft portion by high frequency, and the machinability of the first fitting portion and the second fitting portion may be improved.

Furthermore, in the steel tie rod end according to the third comparative example, the martensite fraction of the minimum area portion is low, and the strength of the shaft portion is poor. This is because oil cooling is applied in the quenching process to delay a cooling speed for quenching.

In each of the steel tie rod ends according to the first to third embodiments, the average hardness of the radial cross section of the minimum area portion is higher by 100 Hv or above than the average hardness of the radial cross sections of the first end portion and second end portion. Thus, in each of the steel tie rod ends according to the first to third embodiments, a high strength may be ensured at the minimum area portion (that is, shaft portion), and high machinability may be ensured at the first end portion and the second end portion.

The invention claimed is:

1. A steel tie rod end, comprising:
a shaft portion;
a first fitting portion that is continuous with a first end portion of the shaft portion in a longitudinal direction of the shaft portion; and
a second fitting portion that is continuous with a second end portion of the shaft portion in the longitudinal direction of the shaft portion, wherein:
the shaft portion has a minimum area portion that is located between the first end portion and the second end portion, and a radially cross-sectional area of the minimum area portion is 80% or below of a radially cross-sectional area of the first end portion and 80% or below of a radially cross-sectional area of the second end portion;
a martensite fraction of a steel structure of the minimum area portion is 90% or above,
a surface hardness of the minimum area portion and an average hardness of a radial cross section of the minimum area portion are 600 Hv or below; and
an average hardness of a radial cross section of the first fitting portion and an average hardness of a radial cross section of the second fitting portion are 300 Hv or below.

2. The steel tie rod end according to claim 1, wherein the average hardness of the radial cross section of the minimum area portion is higher by 100 Hv or above than the average hardness of the radial cross section of the first fitting portion and the average hardness of the radial cross section of the second fitting portion.

3. The steel tie rod end according to claim 1, wherein a radially cross-sectional area of the shaft portion gradually varies from the first end portion toward the minimum area portion, and gradually varies from the second end portion toward the minimum area portion.

4. The steel tie rod end according to claim 1, wherein the steel tie rod end is made of S48C or boron steel.

5. A method of manufacturing a steel tie rod end, comprising:
a forming process of forming a tie rod end intermediate that includes a prospective shaft portion, a prospective first fitting portion continuous with a prospective first end portion of the prospective shaft portion in a longitudinal direction of the prospective shaft portion and a prospective second fitting portion continuous with a prospective second end portion of the prospective shaft portion in a longitudinal direction of the prospective shaft portion;
a quenching process of applying high-frequency quenching to the prospective shaft portion of the tie rod end intermediate and then cooling the prospective shaft portion; and
a machining process of machining at least one of the first fitting portion and the second fitting portion, wherein:
in the forming process, a prospective minimum area portion is formed between the prospective first end portion and the prospective second end portion in the prospective shaft portion so that a radially cross-sectional area of the prospective minimum area portion is 80% or below of a radially cross-sectional area of the prospective first end portion and 80% or below of a radially cross-sectional area of the prospective second end portion; and
in the quenching process, only the prospective shaft portion is heated by high frequency to an austenitizing temperature and then rapidly cooled by water or cooling medium.

6. The method according to claim 5, further comprising a tempering process of, after the quenching process, heating the prospective shaft portion again and then cooling the prospective shaft portion.

7. The method according to claim 6, wherein, in the tempering process, the prospective shaft portion is heated to 350° C. or higher.

8. The method according to claim 5, wherein the tie rod end intermediate is made of boron steel.

9. The method according to claim 7, wherein the tie rod end intermediate is made of S48C.

* * * * *